(12) United States Patent
Valjakka et al.

(10) Patent No.: US 10,726,102 B2
(45) Date of Patent: Jul. 28, 2020

(54) METHOD OF AND SYSTEM FOR PROVIDING ACCESS TO ACCESS RESTRICTED CONTENT TO A USER

(71) Applicant: SC Intelligent Holding Ltd., Lappeenranta (FI)

(72) Inventors: Lauri Valjakka, Lappeenranta (FI); Jukka-Pekka Jussila, Lappeenranta (FI); Jari Tapio, Lappeenranta (FI)

(73) Assignee: IPRA Technologies Oy Ltd., Lappeenranta (FI)

( * ) Notice: Subject to any disclaimer, the term of this patent is extended or adjusted under 35 U.S.C. 154(b) by 0 days.

(21) Appl. No.: 14/591,952

(22) Filed: Jan. 8, 2015

(65) Prior Publication Data

US 2015/0193601 A1 Jul. 9, 2015

(30) Foreign Application Priority Data

Jan. 8, 2014 (FI) ...................................... 20145013

(51) Int. Cl.
*G06F 21/10* (2013.01)

(52) U.S. Cl.
CPC .................................. *G06F 21/10* (2013.01)

(58) Field of Classification Search
CPC ............. G06F 21/6245; G06F 21/6218; G06F 21/6209; G06F 21/62; H04L 63/102
See application file for complete search history.

(56) References Cited

U.S. PATENT DOCUMENTS

| 8,184,811 | B1 | 5/2012 | Patten et al. |
| 2003/0172278 | A1* | 9/2003 | Farnham ............. H04L 63/0435 |
| | | | 713/176 |
| 2003/0210789 | A1* | 11/2003 | Farnham ............... H04L 9/0844 |
| | | | 380/270 |
| 2004/0139315 | A1 | 7/2004 | Tokutani et al. |
| 2005/0039034 | A1 | 2/2005 | Doyle et al. |
| 2005/0071280 | A1 | 3/2005 | Irwin et al. |
| 2005/0273629 | A1 | 12/2005 | Abrams et al. |
| 2009/0254751 | A1* | 10/2009 | Fujiwara ................... H04L 9/12 |
| | | | 713/171 |

(Continued)

FOREIGN PATENT DOCUMENTS

| CN | 101739522 B | 1/2013 |
| EP | 1189432 A2 | 3/2002 |

(Continued)

*Primary Examiner* — Yonas A Bayou
(74) *Attorney, Agent, or Firm* — Seppo Laine Oy

(57) ABSTRACT

According to an example embodiment of the invention, there is provided a system for providing access to access restricted content to a user, the system including a communication arrangement operable to receive a content request message, the content request message including a content identifier, a processor configured to cause a first determination to be performed to yield a positive or a negative result, a validation module configured to, in response to the first determination yielding a positive result, obtain a first digital rights management key, the processor being further configured to cause a second determination to be performed to yield a positive or a negative result, and responsive to the first and second determinations yielding a positive result, the validation module is configured to cause access to the access restricted content to be provided to the user.

11 Claims, 8 Drawing Sheets

(56) References Cited

U.S. PATENT DOCUMENTS

| | | | |
|---|---|---|---|
| 2010/0211779 A1* | 8/2010 | Sundaram | H04L 9/0847 713/168 |
| 2010/0250388 A1 | 9/2010 | Lee | |
| 2010/0268649 A1* | 10/2010 | Roos | G06F 21/10 705/50 |
| 2010/0275023 A1* | 10/2010 | Fujiwara | H04N 21/239 713/171 |
| 2011/0010298 A1 | 1/2011 | Robert et al. | |
| 2012/0144200 A1* | 6/2012 | Liu | H04L 9/0844 713/171 |
| 2012/0221853 A1 | 8/2012 | Wingert et al. | |
| 2012/0308008 A1* | 12/2012 | Kondareddy | H04L 63/0471 380/273 |
| 2013/0024701 A1 | 1/2013 | Hwang et al. | |
| 2013/0174272 A1 | 7/2013 | Chevalier et al. | |
| 2013/0268771 A1* | 10/2013 | Blankenbeckler | H04L 9/0866 713/189 |
| 2013/0325994 A1* | 12/2013 | Chai | H04L 67/1097 709/208 |
| 2014/0059156 A1 | 2/2014 | Freeman, II et al. | |
| 2014/0281576 A1* | 9/2014 | Suzuki | G06F 12/1408 713/189 |
| 2015/0101069 A1 | 4/2015 | Stappenbeck et al. | |
| 2015/0229473 A1* | 8/2015 | Klein | H04L 9/0841 713/171 |
| 2016/0374133 A1* | 12/2016 | Logue | H04W 8/005 |

FOREIGN PATENT DOCUMENTS

| | | |
|---|---|---|
| EP | 1326157 A2 | 7/2003 |
| EP | 2273409 A2 | 1/2011 |
| JP | 2003218851 A | 7/2003 |
| JP | 2009507433 A | 2/2009 |
| JP | 2011013714 A | 1/2011 |
| KR | 20090000042 A | 1/2009 |
| WO | WO 2007028099 A2 | 3/2007 |

* cited by examiner

FIGURE 7

0 = no encryption, only header

1 = only key #1

2 = keys #1 and #2

3 = keys #1 and #3, where key #3 is prepared with key #2

4 = keys #1, #2 and #3

5 = keys #1, #2 and #3, where key #3 is prepared with key #2

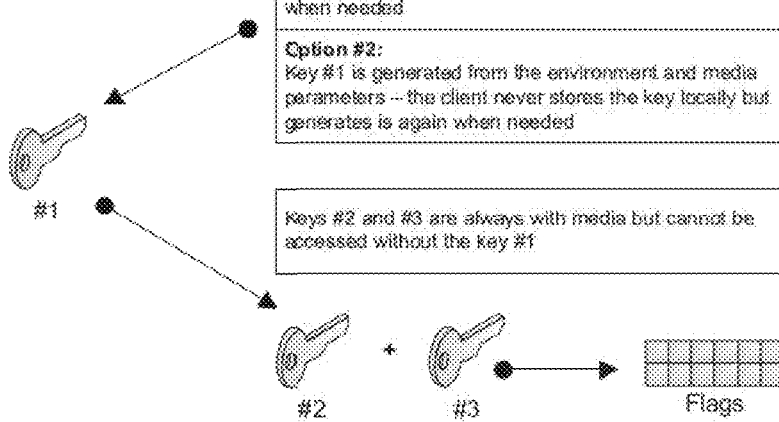

FIGURE 8

Option #1:
Key #1 is received from the server – the client never stores the key locally but retrieves it from the server when needed Option #2:
Key #1 is generated from the environment and media parameters – the client never stores the key locally but generates it again when needed Keys #2 and #3 are always with media but cannot be accessed without the key #1

Flags carried by the DRM header identify the behaviour for the keys #2 and #3. The flags can be accessed with a valid key #1. The sequential order of usage of the keys is:
- open DRM header with key #1
- open content with key #1
- prepare key #3 with key #2 if DRM flags indicate to
- open content with key #2 if DRM flags indicate to
- open content with key #3 if DRM flags indicate to

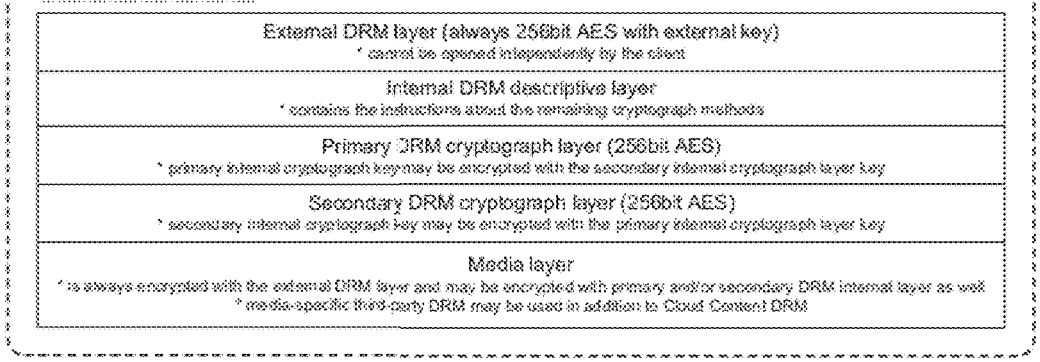
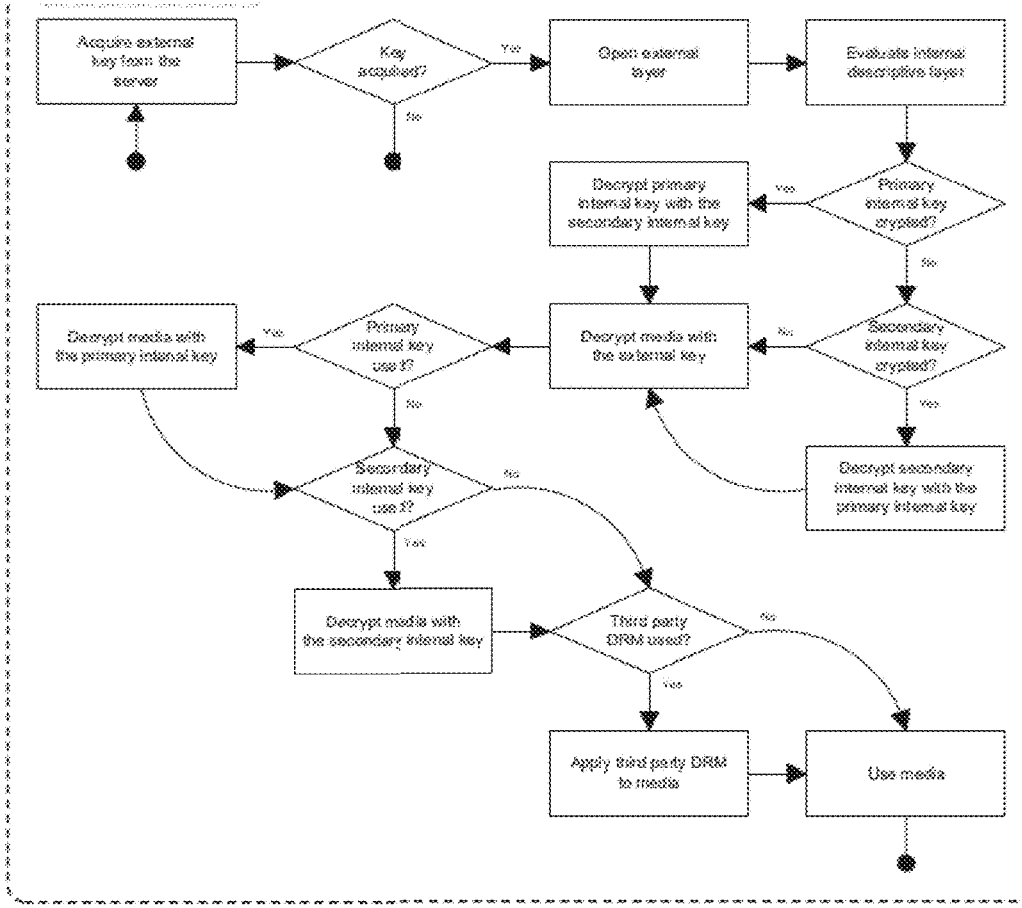

METHOD OF AND SYSTEM FOR PROVIDING ACCESS TO ACCESS RESTRICTED CONTENT TO A USER

FIELD OF THE INVENTION

This invention relates generally to a method of using digital rights management keys to provide access to access restricted content. In particular, this invention relates to an apparatus, method and/or system for providing access to access restricted content to a user and a method thereof.

BACKGROUND TO THE INVENTION

Many publishers, copyright holders, and individuals wish to control the use of digital content and devices after sale. There are numerous ways of controlling and protecting such digital content, for example, using digital rights management methods. However, such digital rights management methods are in general not effective.

The aim of the present invention is thus to provide an alternative method of and a system for providing access to access restricted content to a user.

SUMMARY OF THE INVENTION

According to a first aspect of the invention, there is provided a system for providing access to access restricted content to a user, the system including a communication arrangement operable to receive a content request message, the content request message including a content identifier, a processor configured to cause a first determination to be performed to yield a positive or a negative result, a validation module configured to, in response to the first determination yielding a positive result, obtain a first digital rights management key, the processor being further configured to cause a second determination to be performed to yield a positive or a negative result, and responsive to the first and second determinations yielding a positive result, the validation module is configured to cause access to the access restricted content to be provided to the user.

According to a second aspect of the present invention, there is provided a method, comprising receiving a content request message, the content request message including a content identifier of an access restricted content, causing a first determination to be performed to yield a positive or a negative result, obtaining, in response to the first determination yielding a positive result, a first digital rights management key, causing a second determination to be performed to yield a positive or a negative result, and responsive to the first and second determinations yielding a positive result, causing access to the access restricted content to be provided to the user.

In a first set of embodiments of the invention in accordance with the second aspect, the method comprises causing transmission of the access restricted content to the user, wherein the access restricted content comprises in encrypted form at least one of a second and a third digital rights management key, wherein the at least one of the second and a third digital rights management key is obtainable from the access restricted content by using the first digital rights management key.

In a second set of embodiments of the invention in accordance with the second aspect, the second determination is based at least in part on a fingerprint of the access restricted content.

According to a first set of variants of the second set of embodiments in accordance with the second aspect, the method comprises performing the second determination by comparing a first fingerprint received in the apparatus from the user to a second fingerprint received in the apparatus from a content database.

According to a third aspect of the present invention, there is provided an apparatus, comprising at least one processor and a memory comprising program instructions, the processor, memory and program instructions configured to cause the apparatus at least to obtain an access restricted content from at least one of a content database and a content providing server, obtain a first digital rights management key, derive, using the first digital rights management key, from the access restricted content information describing encryption properties of the access restricted content, and to derive, using the information describing encryption properties of the access restricted content, from the access restricted content at least one of a content payload and a second digital rights management key.

According to a fourth aspect of the present invention, there is provided a method, comprising obtaining an access restricted content from at least one of a content database and a content providing server, obtaining a first digital rights management key, deriving, using the first digital rights management key, from the access restricted content information describing encryption properties of the access restricted content, and deriving, using the information describing encryption properties of the access restricted content, from the access restricted content at least one of a content payload and a second digital rights management key.

According to a fifth aspect of the present invention, there is provided a non-transitory computer readable medium having stored thereon a set of computer readable instructions for a causing an apparatus to perform actions, the computer readable instructions comprising code for receiving a content request message, the content request message including a content identifier of an access restricted content, code for causing a first determination to be performed to yield a positive or a negative result, code for obtaining, in response to the first determination yielding a positive result, a first digital rights management key, code for causing a second determination to be performed to yield a positive or a negative result, and code for causing, responsive to the first and second determinations yielding a positive result, access to the access restricted content to be provided to the user.

According to a sixth aspect of the present invention, there is provided an apparatus, comprising at least one processor and a memory comprising program instructions, the processor, memory and program instructions configured to cause the apparatus at least to receive a content request message, the content request message including a content identifier of an access restricted content, cause a first determination to be performed to yield a positive or a negative result, obtain, in response to the first determination yielding a positive result, a first digital rights management key, cause a second determination to be performed to yield a positive or a negative result, and responsive to the first and second determinations yielding a positive result, to cause access to the access restricted content to be provided to the user.

In some embodiments of the invention in accordance with the first, second, third, fourth, fifth and/or sixth aspects the first digital rights management key is unique to a specific session.

In response to a determination that the received content identifier and user identifier matches with any combination of the stored user identifiers and content identifiers, the validation module may generate a first digital rights management key and a header associated with the content identifier.

The communication arrangement may be operable to receive a content usage request message, the content usage request message including the user identifier, the first digital rights management key and the content identifier.

In an embodiment, the interrogation module may further be operable to interrogate the content database in order to determine whether or not the first digital rights management key and content identifier matches with any combination of first digital rights management key and the content identifier stored in the content database; and if the answer is affirmative, the validation module may provide content access to access restricted content to the user.

The header may be associated with the particular content and the first digital rights management key are used to obtain access to the access restricted content.

The validation module may further analyze the header associated with the first digital rights management key and may prepare a second digital rights management key.

The system may include a decryption module operable to use the first digital rights management key and second and third digital rights management keys in order to decode the content, thereby allowing the user use of content.

The validation module may further analyze the second digital rights management key in order to prepare a third digital rights management key.

In this embodiment, the interrogation module may be operable to determine whether or not the second digital rights management key is used to prepare the third digital rights management key; and if the answer is affirmative, the decryption module may use the first digital rights management key and the third digital rights management key to decode the content, thereby allowing the user use of content.

If the answer is negative, the decryption module may use the first digital rights management key, the second digital management key and the third digital rights management key to decode the content, thereby allowing the user use of content.

The content may be compressed. In some embodiments, the content is media content.

In this embodiment, the system may include an extraction module being operable to extract the compressed content, thereby allowing the user use of the content.

In addition, the system may include a calculation module being operable to calculate a time period indicative of time in which the user uses the content. The validation module may stop the use of the content by the user, in response to a determination that the calculated time period is equal to a pre-defined time period.

In an alternative embodiment, the system may include a content registration module being operable to register the status content usage against the user identifier and the content identifier on the content database. The status content usage may include the calculated time period associated with the user identifier and the content identifier.

In at least some embodiments, the user identifier is an identifier associated with a communication device of the user such as a MSISDN number of the communication device.

The invention further extends to a non-transitory computer readable medium having stored thereon a set of computer readable instructions for a causing a processor to provide access to access restricted content to a user comprising the computer implemented steps of;

receiving a content request message, the content request message including a unique identifier associated with the user and a content identifier;

interrogating a content database of content identifiers, digital management keys and user identifiers in order to determine whether or not the received content identifier and user identifier matches with any combination of the stored user identifiers and content identifiers;

in response to a determination that there is a match, retrieving a first digital rights management key and a header associated with the user identifier;

interrogating the content database in order to determine whether or not the content identifier and the first digital rights management key matches with any combination of content identifier and first digital rights management key stored in the content database and associated with the user identifier; and if the answer is affirmative, providing the content to the user.

In response to a determination that the received content identifier and user identifier matches with any combination of the stored user identifiers and content identifiers, the computer readable instructions may include the computer implemented step of generating a first digital rights management key and a header associated with the content identifier.

The computer readable instructions may include the computer implemented steps of;

receiving a content access request message, the content access request message including the user identifier, the first digital rights management key and the content identifier;

interrogating the content database in order to determine whether or not the first digital rights management key and content identifier matches with any combination of first digital rights management key and the content identifier stored in the content database; and if the answer is affirmative, the providing content access to access restricted content to the user.

BRIEF DESCRIPTION OF THE DRAWINGS

The invention will be described, by way of example only, with reference to the accompanying drawings in which:

FIG. 7 illustrates different DRM levels;

FIG. 8 illustrates DRM key handling options;

FIG. 9 illustrates DRM layers, and

FIG. 10 illustrates an example DRM process sequence.

DETAILED DESCRIPTION

The following description of the invention is provided as an enabling teaching of the invention. Those skilled in the relevant art will recognize that many changes can be made to the embodiment described, while still attaining the beneficial results of the present invention. It will also be apparent that some of the desired benefits of the present invention can be attained by selecting some of the features of the present invention without utilizing other features. Accordingly, those skilled in the art will recognize that many modifications and adaptations to the present invention are possible and can even be desirable in certain circumstances, and are a part of the present invention. Thus, the following description is provided as illustrative of the principles of the present invention and not a limitation thereof.

Figure 1:
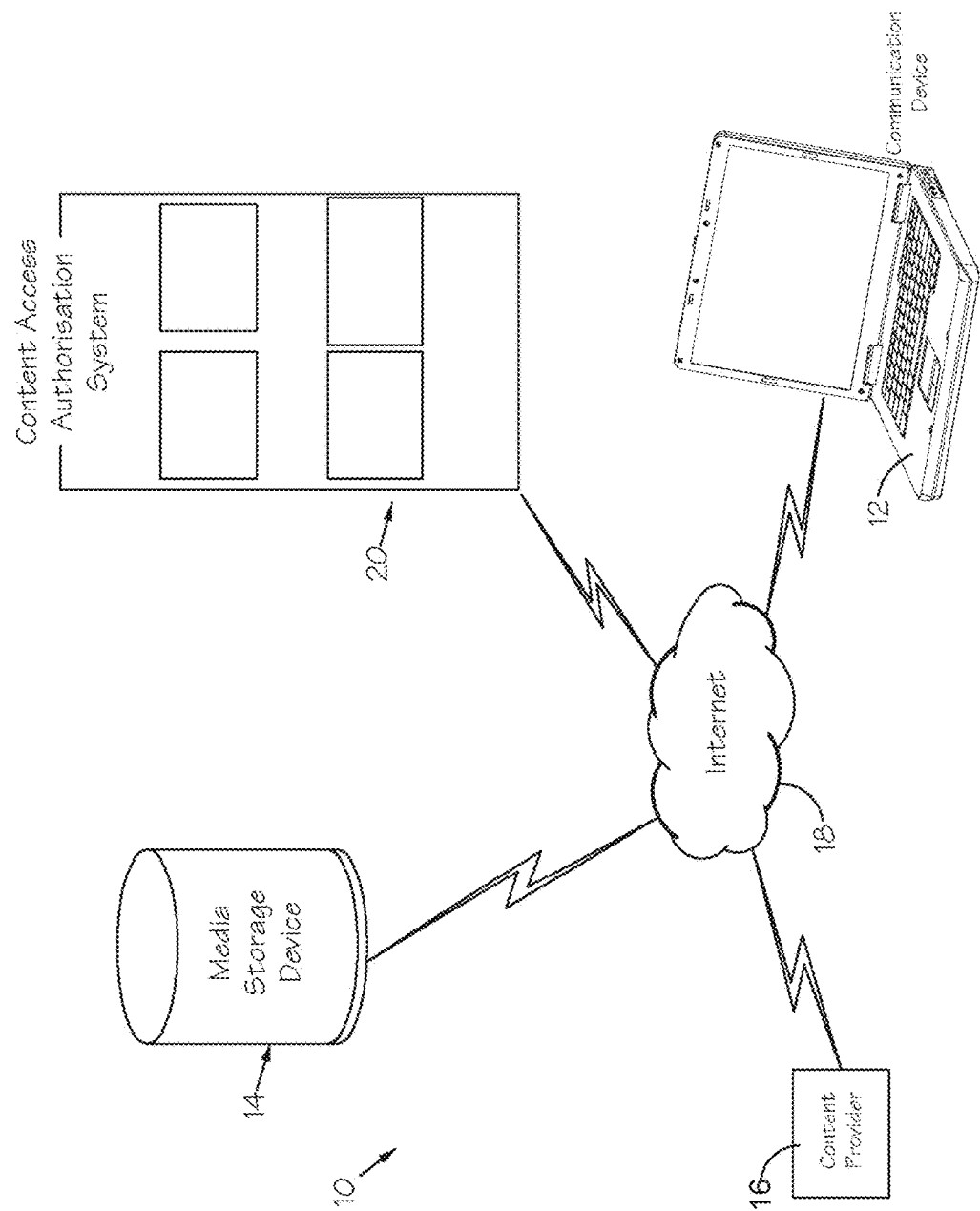
FIG. 1 shows an example of network topology including a system for providing access to access restricted content to a user.
Figure 2:
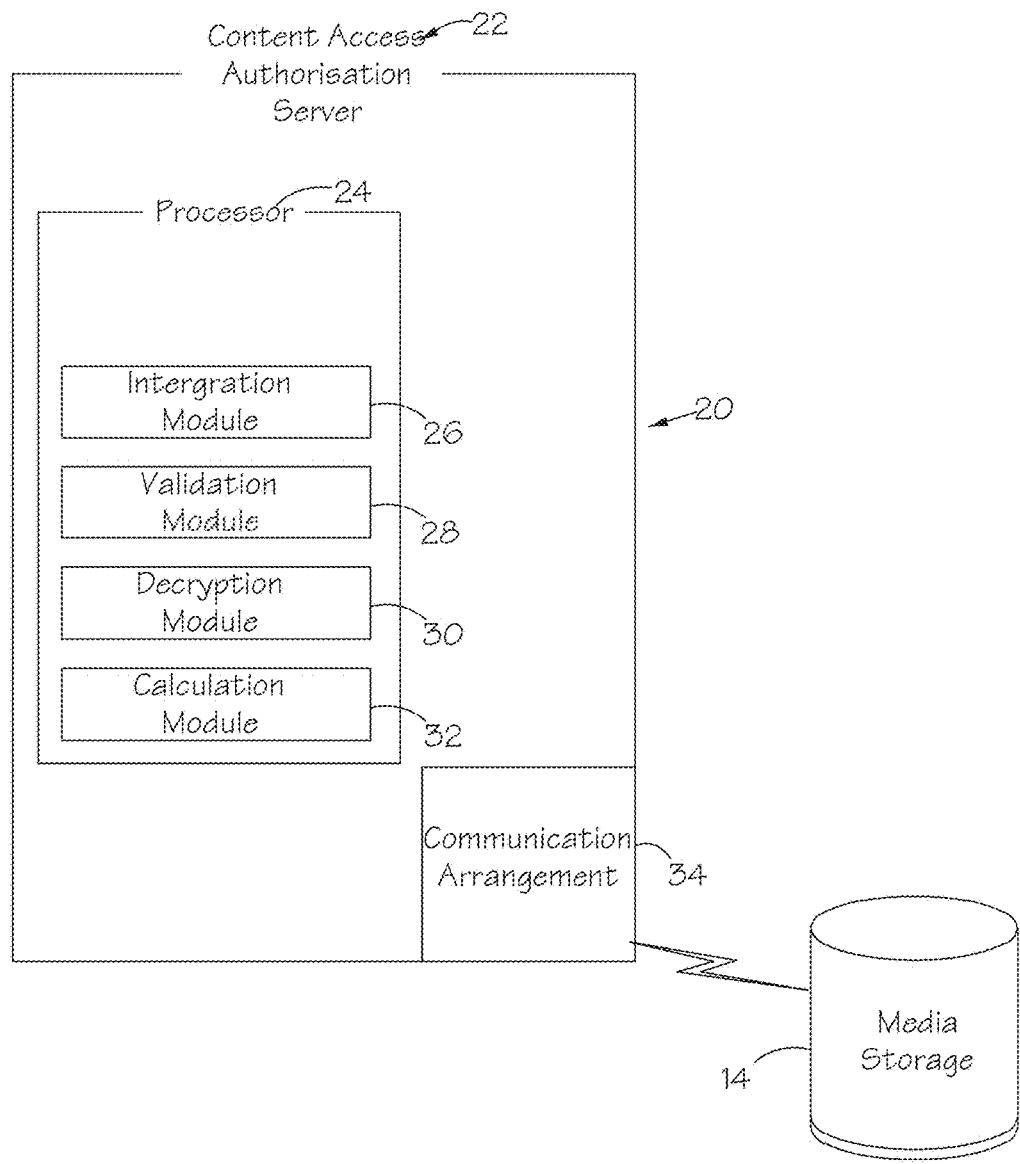
FIG. 2 shows the system of FIG. 1 in more detail.

In FIG. 1 of the drawings, reference numeral 10 refers generally to an example of network topology including a system for providing access to access restricted content to a user. Referring also to FIG. 2, an example system for providing access to access restricted content to a user is indicated by reference numeral 20.

The topology 10 includes a communication device 12 belonging to or used by a user (not shown) who intends to obtain access to access restricted content. It will be appreciated that the communication device 12 is may comprise a personal computer located at the premises of the user, a smart phone or a Personal Digital Assistant (PDA), for example. However, the communication device 12 can be a mobile telephone of the user or any other device with suitable communication capability. Communication device 12 may comprise any suitable device with communication capability, examples including tablet devices, set-top boxes, video game consoles etc.

In simple terms, the user (not shown) attempts to obtain access to access restricted content through the use of the user's communication device 12. The access restricted content may be stored in a database which is indicated as media storage device with reference numeral 14. Prior to the user obtaining access to the access restricted content, the system 20 may be configured to ensure that the user or communication device 12 of the user has particular access, i.e., the communication device 12 is authorized to obtain access to such access restricted content.

The illustrated topology includes a content provider indicated as reference numeral 16. The content provider may be a publisher or a copyright holder, or any suitable person who owns rights to the content and wishes to restrict access to such content. In other cases, the content provider may be the copyright owner, while a content distributor can be another party which has been authorized to manage access to the content on behalf of the content provider 16. The restricted content is digital content in a form of digital media. The digital media can be of any suitable form, for example, text, audio, video, graphics, animations or images.

The system 20 (further described in FIG. 2) is communicatively coupled to a communications network in the form of the Internet 18. Also communicatively coupled to the Internet is the communication device 12. The communication device 12 is thus connected to the system 18 via the Internet, for example. In use, the user may obtain access to the media content through Internet 18. The topology further illustrates a media storage device 14 which may form part of the system 20. Alternatively, the system 20 may be connected to the media storage device 14 via Internet 18 (as shown in FIG. 1).

Referring now to FIG. 2, the system 20, hereafter referred to as a content access authorization system 20, includes a content access authorization server 22 which, in turn, includes a processor 24 defining a plurality of modules 26, 28, 30 and 32 which correspond to functional tasks performed by the processor 24. The processor 24 includes an interrogation module 26, a validation module 28, a calculation module 30 and a decryption module 32. Modules 26, 28, 30 and 32 may be comprised of software modules configured to cause processor 24 to perform corresponding functions, or the modules may comprise hardware and software elements. For example, a decryption module may comprise decryption software and hardware features of processor 24 designed to facilitate decryption of data in processor 24. Processor 24 may comprise an Intel Atom processor, for example. Server 22 may comprise memory, which is not illustrated, the memory being operable to store computer instructions processor 24 may execute to cause server 22 to perform various actions.

The content access authorization server 22 further includes a communication arrangement 34 operable to connect to the Internet 18. Communication arrangement 34 may comprise, for example, an Ethernet, fiber optic of wireless data interface. The authorization system 20 is operably connectable to a content database, that is, media storage device 14 for storing media content, content identifiers, digital management keys and/or user identifiers. The data storage device 14 can form part of the server 22 or be comprised as a standalone device external to server 22. In particular, there may be a plurality of media storage devices located within premises of various content providers and/or content distributors and communicatively coupled to the media storage device 14. The media storage device 14 stores therein a plurality of content identifiers and associated content, digital rights management keys and/or user identifiers. For example, each user may be able to have access to a particular content associated with a particular content identifier. Such user will be identified through the user identifier. In particular, the user identifier may comprise an identifier associated with the personal computer 12 of the user. In this case, the user may only be able to obtain access to the access restricted content, if the user attempts to access the access restricted content using the personal computer 12. In an embodiment where the communication device 12 is a mobile telephone, the identifier associated with the user may comprise an MSISDN number or session initiation protocol SIP identity associated with that particular mobile telephone.

Although described herein primarily with reference to an authorization server, communication device 12 may have similar structure, in particular communication device 12 may comprise a processor, memory and a communications arrangement which may each be similar to those described above.

Figure 3:
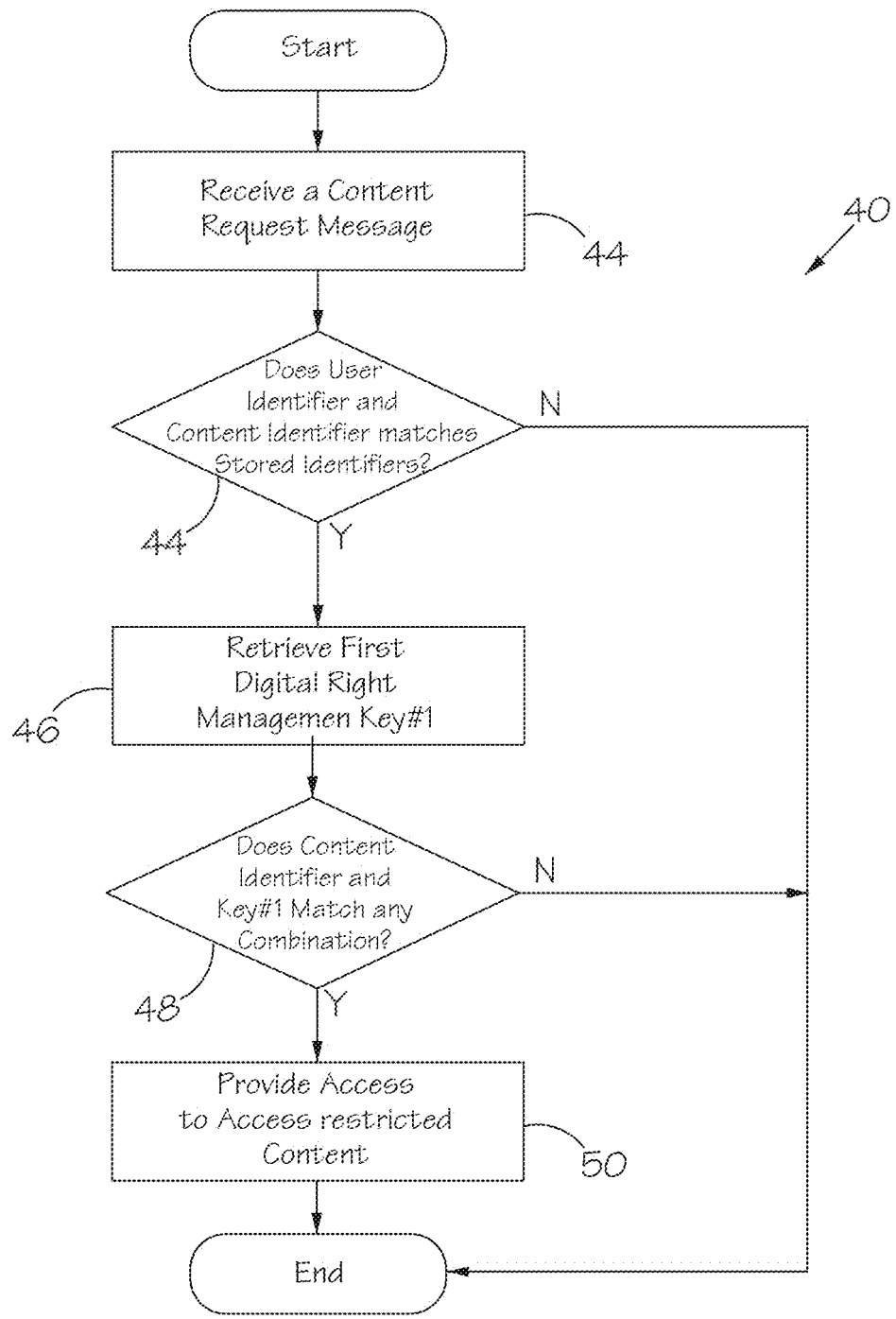
FIG. 3 shows a flowchart representing an example method of providing access to access restricted content to a user, according to another aspect of the present invention.

Referring now also to FIG. 3 which shows a high-level method for providing access to access restricted content to a user, in accordance with at least one embodiment of the invention. The example method 40 is not necessarily dependent on the system 20 and/or the network topology 10, and vice versa.

In the illustrated embodiment, the communication arrangement 34 receives (at block 44) a content request message from the personal computer 12 of the user. The content request message includes a unique identifier associated with the user and a content identifier. Therefore, the user can user a user interface, e.g., a keyboard and input, e.g., serial number of the personal computer 12 and a predefined number of the content to which user wishes to obtain access. The communication arrangement can include a receiver module (not shown) operable to receive the content request message.

The interrogation module 26 interrogates (at block 44) the media storage device 14 whether or not the received content identifier and user identifier matches with any combination of the stored user identifiers and content identifiers. This is so as to check whether the user, for example, the communication device 12 of the user is registered to be able to have access to the media content. The media storage device 14 may have been populated during a period when the user pre-registered to have access to the access restricted content. For example, when the user purchased the media content, the user could have been requested to pre-register then. The pre-registration process can take any conventional format. For example, pre-registration may comprise that certain subscriber classes in a cellular network are granted access to certain classes of content, wherein granting access to a class of content comprises granting access to each content item comprised in the class of content.

The validation module 28 retrieves (at block 46) a first digital rights management key (Key #1) and a header associated with the user identifier in response to a determination that the received content identifier and user identifier matches with at least one combination of the stored user identifiers and content identifiers. Key #1 is retrieved from the media storage device 14, alternatively, Key #1 can be retrieved from a server which is located at the premises of the content distributor and/or content provider. In other embodiments, the Key #1 can be located at a server located at the user's premises. The interrogation module (at block 48) further interrogates the media storage device 14 in order to determine whether or not the content identifier and the Key #1 matches with any combination of content identifier and f Key #1 stored in the media storage device 14 and associated with the user identifier. If the answer is affirmative, the validation module (at block 50) provides the access restricted media content to the user. Therefore, the Key #1 may be associated with the personal computer 12 of the user. In this instance, the Key #1 is used to provide the user access to access restricted media content. The Key #1 only provides access to the content i.e. the user is not able to use the content. Therefore, if the user attempts to obtain access to the access restricted content using a different personal computer, the user will not be able to obtain such access. This will prohibit users from providing the Key #1 to any other party in order for that party to access the access restricted content at another personal computer. The header is associated with the particular media content and the Key #1 and the header are used to obtain access to the access restricted content.

In an embodiment, in response to a determination that the received content identifier and user identifier matches with any combination of the stored user identifiers and content identifiers, the validation module 28 may generate (not shown) a first digital rights management key and a header associated with the content identifier. The Key #1 can be generated from the environment and media content parameters. Generating a key from environment and media content parameters may comprise, for example, using parameters relating to communication device 12, a subscription of the user or aspects of the content in a key generation process. As a specific example, where communication device 12 comprises a cellular telephone, the key generation process may use as input information relating to a secret stored on a subscriber identity module, SIM, card. Therefore, each time when the user requires access to access restricted content, new Key #1 may be generated.

Once the user has access to the access restricted media content, the user may need to use the media content. In that instance, the communication arrangement 34 may receive (not shown) a content usage request message from the personal computer 12 of the user. In simple terms, the user uses the keyboard to indicate that he/she requires usage of the restricted media content. The content usage request message includes the user identifier, the Key #1 and the content identifier. Therefore, the user will use the generated/retrieved Key #1 in order to be allowed to use the restricted media content. The user may wish to use the restricted media content by, for example, copying the media content, listening to the media content or editing (if allowed) the media content. The validation module 28 analyses the header associated with the Key #1 and prepares a second digital rights management key (Key #2). The preparation of the Key #2 may comprise, for example, performing a cryptographic operation on at least part of the access restricted content, wherein the cryptographic operation may employ Key #1. The cryptographic operation may comprise decrypting Key #2 by using Key #1. A decryption module (30) may be configured to use Key #1 and Key #2 to decode the media content, thereby allowing the user use of media content.

The validation module may further use Key #1 in order to prepare a third digital rights management key (Key #3). It will be appreciated that at least in some embodiments Key #2 and Key #3 cannot be prepared without Key #1. In these embodiments, the interrogation module 26 determines whether or not Key #1 is used to prepare the Key #2, and if the answer is affirmative, the decryption module 30 uses Key #1 and Key #2 to decode the media content, thereby allowing the user use of content. Alternatively, the decryption module may use Key #1, Key #2 and Key #3 to decode the media content, thereby allowing the user use of content. Key #3 may be obtained from the access restricted content using Key #1 in a similar was as described above in connection with obtaining Key #2.

In an example embodiment, the media content is compressed. In this embodiment, the system can include an extraction module (not shown). The extraction module is operable to extract the compressed media content, thereby allowing the user use of the content.

A calculation module 32 calculates (not shown) a time period indicative of time in which the user uses the content. The use of the media content may be available for a particular time period. For example, a user can be allowed to use the media for only one (1) hour. Therefore, the calculation module 32, as the user uses the media content, can calculate the user's usage period. When the calculated time period reaches a pre-defined usage time, e.g., one (1) hour, the validation module 28 stops the use of the media content by the user.

In an alternative embodiment, the system 20 includes a content registration module (not shown). The content registration module registers the status content usage against the user identifier and the content identifier on the media storage device 14. The status content usage includes the calculated time period associated with the user identifier and the content identifier. Therefore, it is possible to detect the rate of usage of the media content for each user, that is, the number of times the media content was accessed. The status content usage will also be able to provide an indication of the last time the media content was accessed by the user.

At least one of the first, second and third digital rights management keys may be, depending on the embodiment, arranged to be session-specific in the sense that it is generated dynamically for use in a single session. This is advantageous since if a session-specific key is compromised, it cannot be used to gain access to content in a subsequent session.

In general there is provided an apparatus, comprising at least one processor and a memory comprising program instructions. The apparatus may comprise a server, for example. The processor, memory and program instructions configured to cause the apparatus at to receive a content request message, the content request message including a content identifier of an access restricted content. The content request message may further comprise an identifier associated with the user. The apparatus may be caused to cause a first determination to be performed to yield a positive or a negative result and to obtain, in response to the first determination yielding a positive result, a first digital rights management key. The first determination may comprise a query, such as a query transmitted to a content database, the query comprising the content identifier and the identifier associated with the user. Alternatively to a query, the first determination may comprise a determination as to whether the access restricted content can be found in accordance with the content request.

The apparatus may be caused to cause a second determination to be performed to yield a positive or a negative result, and responsive to the first and second determinations yielding a positive result, to cause access to the access restricted content to be provided to the user. The second determination may be based at least in part on a fingerprint of the access restricted content. The second determination may comprise a comparison between a first fingerprint received in the apparatus from the user to a second fingerprint received in the apparatus from a content database.

The second determination may comprise a check as to whether the user has rights to access the access restricted content.

In response to the first determination yielding a positive result, for example when a content database returns a positive result to a query, the apparatus is in at least some embodiments configured to obtain a header associated with the content identifier and wherein the header associated with the content identifier and the first digital rights management key are usable to at least in part obtain access to the access restricted content. The header may be obtained by the apparatus, for example, by receiving it from the content database.

In general there is provided a second apparatus comprising at least one processor and a memory comprising program instructions, the processor, memory and program instructions configured to cause the apparatus at least to obtain an access restricted content from at least one of a content database and a content providing server. The second apparatus may be configured to obtain the access restricted content by receiving it over a cellular or Ethernet connection, for example. The second apparatus may be configured to store the access restricted content, at least in part, in a memory comprised in the second apparatus.

The second apparatus may be configured to obtain a first digital rights management key, to derive, using the first digital rights management key, from the access restricted content information describing encryption properties of the access restricted content and derive, using the information describing encryption properties of the access restricted content, from the access restricted content at least one of a content payload and a second digital rights management key. Where the second apparatus is caused to derive a second digital rights management key, it may be further configured to use the first and second digital rights management keys to obtain access to the content payload. The content payload may comprise, for example, a media file such as an audio or video recording.

Figure 4:
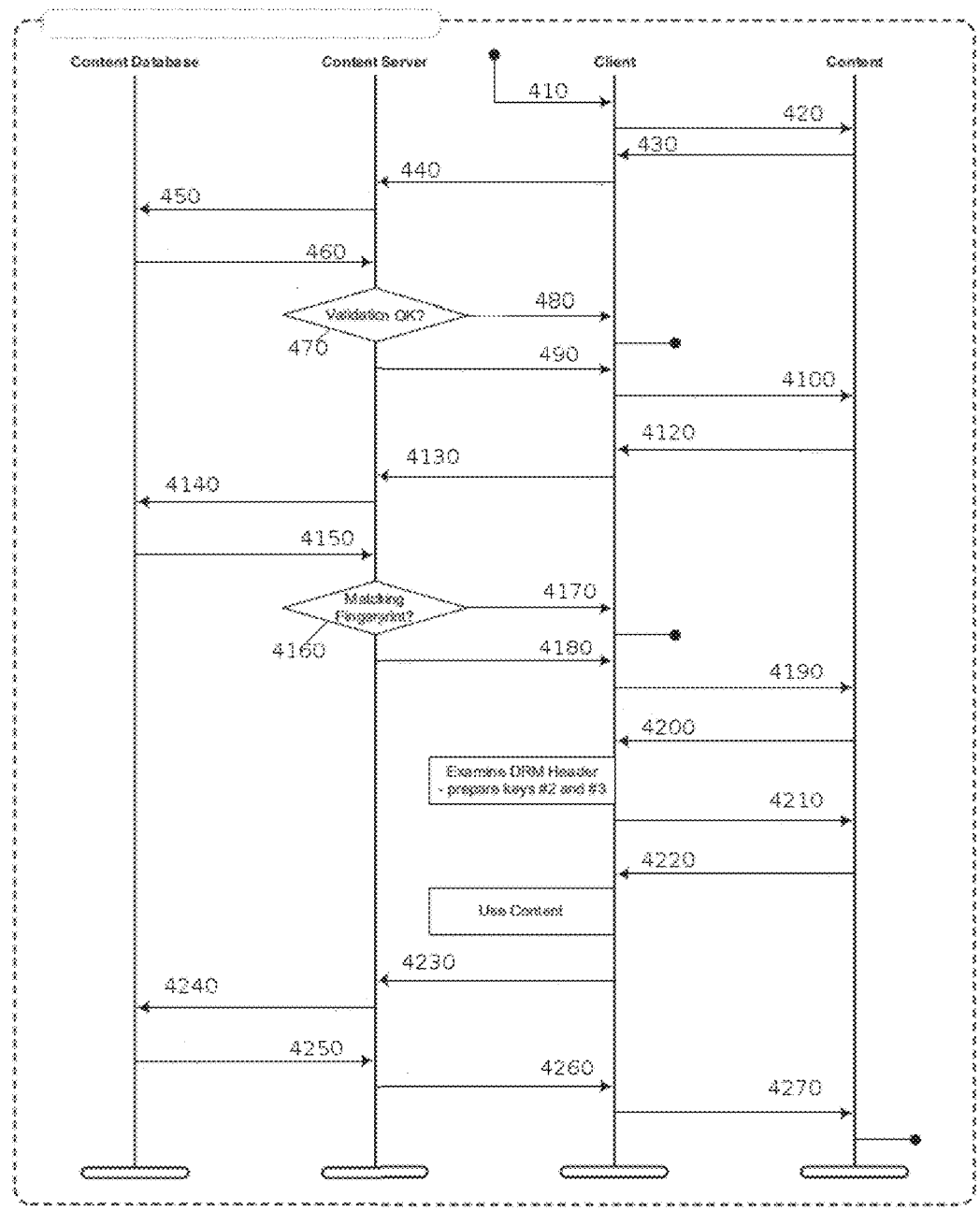
FIG. 4 shows an example flow graph of a first method in accordance with at least some embodiments of the invention.

FIG. 4 shows an example flow graph of a first method in accordance with at least some embodiments of the invention. On the vertical axes are, from left or right, a content database, a content server, a client and content. The illustrated method begins in phase 410 and proceeds to phase 420, where the client performs a content location, for example by searching with at least one keyword. As a response, in phase 430 the client receives a content identifier. In phase 440, the client transmits a message to the content server, the message comprising the content identifier received in phase 430 and an identifier of the client. The message of phase 440 may comprise a content request message. Responsive to receiving the message of phase 440, the content server may transmit, in phase 450, a query to the content database, the query comprising the content identifier and client identifier.

Responsive to the query, the content database may reply, in phase 460, to the content server with a message comprising a validation result wherein the validation result may comprise a first DRM key. The content server determines whether the validation was successful in phase 470. In case the validation was unsuccessful, for example, where the client does not have access to the content, processing advances from phase 470 to phase 480 and ends. On the other hand where the validation was successful and the message of phase 460 comprises a first DRM key, processing advances from phase 470 to phase 490 where the content server transmits the first DRM key to the client.

Responsive to receipt of the first DRM key in phase 490, the client may access the content using at least in part the first DRM key. This is illustrated as phase 4100. The client may obtain, in phase 4120, a fingerprint of the content wherein the obtaining may be based at least in part on the first DRM key. In phase 4130, the client may transmit the fingerprint to the content server, optionally with the content identifier and in phase 4140, the content server may query the content database for the content fingerprint. The query may comprise the content identifier. In phase 4150, the content database may responsively provide the fingerprint to the content server. In phase 4160, the server may compare the fingerprints received in phases 4150 and 4130. In case of mismatch, the processing advances to phase 4170 and ends. In case the fingerprints match, processing advances to phase 4180 where the client is provided with a positive validation result.

Responsive to the positive validation result of phase 4180, the client in phase 4190 proceeds to access the content to retrieve a DRM header, and optionally also to apply the first DRM key to the header, responsive to which the client gains access, phase 4200, to an open DRM header of the content. Using the header the client may be enabled to prepare second and third DRM keys, and, optionally, to apply at least one of the second and third DRM keys to retrieve payload of the content. This retrieval is illustrated as phases 4210 and 4220.

After using the payload of the content, the client may inform the content server of this, phase 4230, and the server may inform the content database of this, in phase 4240. In phase 4250, the content database may inform the content server of a registration of the content, the message of phase 4250 optionally comprising a result code. The content server may notify the client of this, phase 4260 and the client may modify the content accordingly, phase 4270.

When the first method is used, at least one of the following may apply:

1) the client has an on-line connection with the server, and 2) the client has acquired the content before the validation starts.

Figure 5:
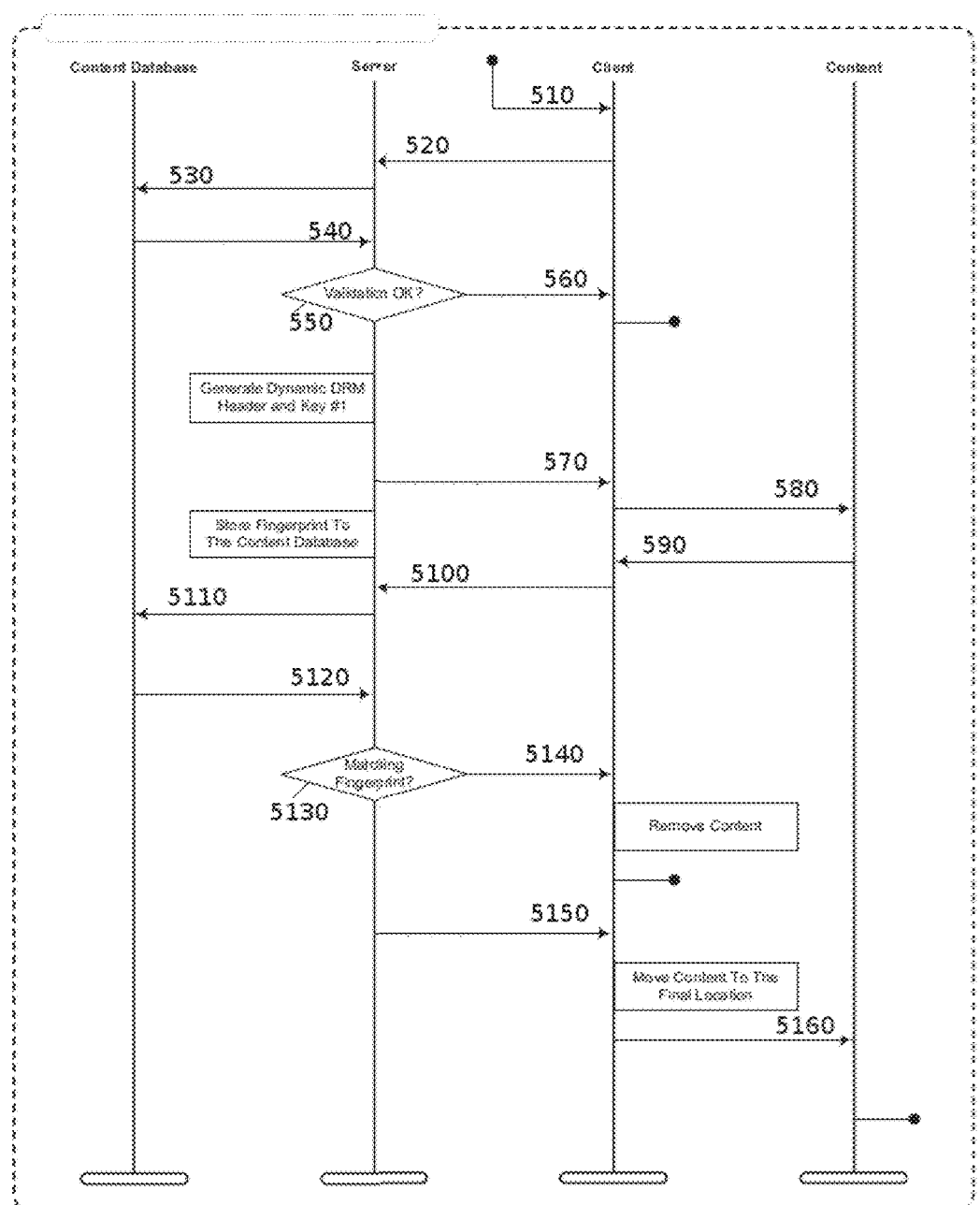
FIG. 5 shows an example flow graph of a second method in accordance with at least some embodiments of the invention.

FIG. 5 shows an example flow graph of a second method in accordance with at least some embodiments of the invention. The vertical axes are identical to those in FIG. 4. The process of FIG. 5 begins in phase 510 and proceeds to phase 520, where the client requests content from the server. The message of phase 520 may comprise a content identifier and client identifier. The server may, phase 530, query the content database with the content identifier and client identifier. The content database replies in phase 540 whether the client should be granted access to the content.

In phase 550 the server determines whether the validation was successful, in other words whether the client is to be granted access to the content. In case no, processing advances to phase 560 and the process ends. In case the answer is yes, the server generates a DRM header, for example a dynamic DRM header, and a first DRM key. In phase 570 the server encrypts the content and streams it to the client, as well as calculates a content fingerprint.

In phase 580 the client saves the received content, optionally in a temporary location and in phase 590 the client obtains from the content a content fingerprint, which is sent along with the content identifier to the server in phase 5100.

In phase 5110 the server queries the content database for a content fingerprint of the content, the query comprising the content identifier and the client identifier. The server receives the fingerprint from the database in phase 5120. In phase 5130 the server determines whether the fingerprints received in phases 5120 and 5100 are the same. In case they are not, the server informs the client of this in phase 5140, and responsively the client removes the content it stored in phase 580. In case the fingerprints match, phase 5150, the client is informed of this. In embodiments where the content was stored in a temporary location in phase 580, the client in phase 5160 moves the content to a final location. In embodiments where the content was stored in a non-temporary location in phase 580, the client may validate the content in phase 5160.

When the second method is used, at least one of the following may apply:
1) the client has an on-line connection to the server for receiving the streamed content, and 2) the client has been registered to the server before the streaming is started.

Figure 6:
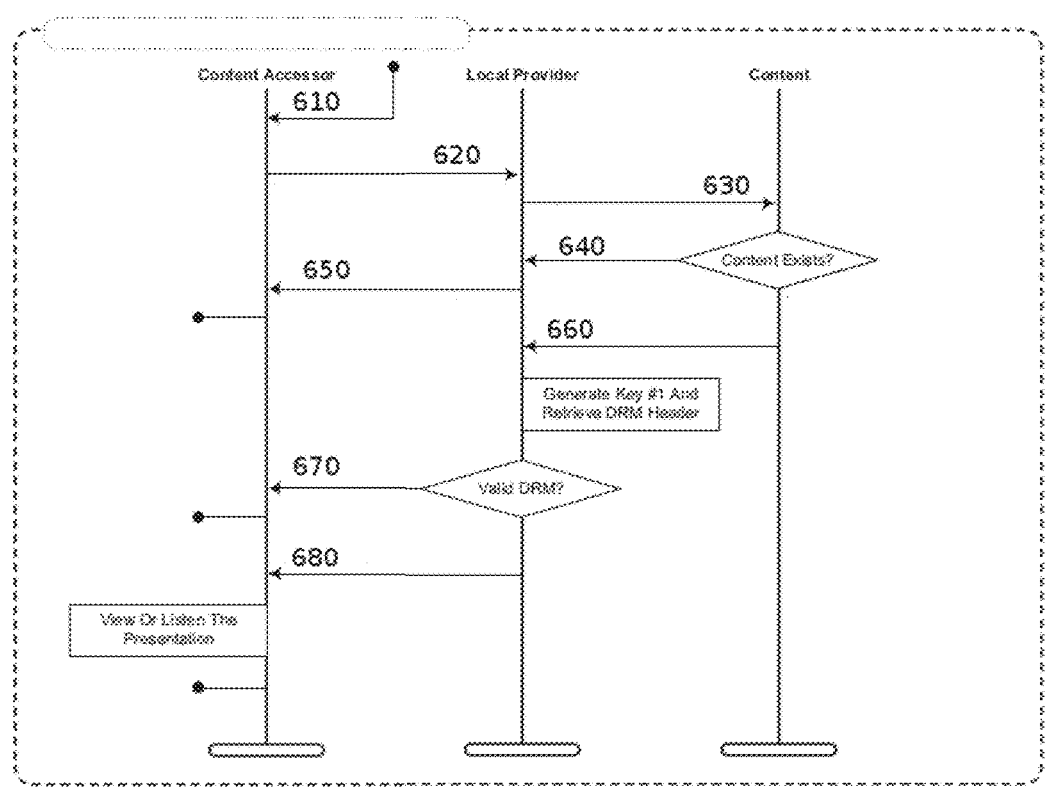
FIG. 6 shows an example flow graph of a third method in accordance with at least some embodiments of the invention.

FIG. 6 shows an example flow graph of a third method in accordance with at least some embodiments of the invention. On the vertical axes are illustrated, from left to right, a content accessor, who may be a client, a local provider and the content being accessed. The process begins in phase 610 and proceeds to phase 620, where the content accessor requests content from a local provider with a content identifier comprised in the request message. In phase 630, the local provider locates the content using the content identifier. In case the content is determined to not exist, processing advances to phase 640 and 650, where the local provider informs the accessor of this and the process ends. On the other hand if the content is determined to exist, processing advances to phase 660. The local provider generates a first DRM key and obtains a DRM header. The DRM is verified, and in case the verification fails processing advances to phase 670 where the content accessor is informed of this and processing ends. On the other hand if DRM verification succeeds, processing advances to phase 680 and the content accessor is granted access to the content, which may comprise, for example, an audio, video, or audiovisual presentation.

When the third method is used, at least one of the following may apply:
1) the content has been delivered to the content accessor from the server or from an external supplier. 2) the client is able to use the content without leaving it in an unprotected state. 3) the content is provided in a format that cannot be stored for later access, and 4) the content DRM is accessed only when the content needs to be shown or played.

FIG. 7 illustrates different DRM levels. DRM levels may in this example be numbered from zero to five, with each level providing for different encryption and key management functionalities. Which level is used for a specific content item, may be determined from a DRM header of the content, for example. The keys described in the Figure may comprise DRM keys, for example.

FIG. 8 illustrates DRM key handling options.

FIG. 9 illustrates DRM layers in an example embodiment of the invention. The illustrated layers may be applied in sequence to the media layer, which may comprise a payload of the content item. To obtain access to the payload, a user may need to apply decryption operations in reverse order to the order in which encryption operations were performed. In different embodiments, at least one of the encryption layers illustrated in FIG. 9 may be omitted.

FIG. 10 illustrates an example DRM process sequence in an example embodiment of the invention. In the illustrated example, a set of DRM encryption layers such as the one illustrated in FIG. 9 is opened in phases to ultimately allow access to the media, that is the content payload.

It should be noted that in the above, a "server" may take different forms depending on the embodiment. In particular, alternatively to a fixed computer residing in a network, in some embodiments a server may comprise a peer device to the client device, such as for example where the client device is a tablet or smartphone device, the server may also be a tablet or smartphone device.

The invention claimed is:

1. An apparatus, comprising at least one processor and a memory comprising program instructions, the processor, memory and program instructions configured to cause the apparatus at least to:
    obtain an access restricted content from at least one of a content database and a content providing server;
    obtain a first digital rights management key from the content database, wherein the obtaining is based at least in part on a query, the query comprising the content identifier and an identifier associated with the user;
    using the first digital rights management key, obtain a fingerprint of the access restricted content wherein the obtaining is based at least in part on the first digital rights management key,
    cause the content providing server to validate the fingerprint, and, if the validation is successful, access the access restricted content and
    derive a second and third digital rights management key from the access restricted content using the digital rights management header of the access restricted content
wherein the second and third digital rights management keys are applied to retrieve the payload of the access restricted content and wherein at least one of the second or third digital rights management key is used to encrypt the other key of the second or third digital rights management key
wherein the content is usable without being in an unprotected state.

2. The apparatus according to claim 1, wherein the apparatus is caused to obtain the first digital rights management key either by receiving it from a server or by generating it at least in part from at least one of environmental parameters and parameters of the access restricted content.

3. The apparatus of claim 1, wherein the first digital rights management key is unique to a specific session.

4. The apparatus of claim 1, wherein the access restricted content comprises a first layer that is decryptable using the first digital rights management key, the first layer comprising information on which key may be used to obtain fuller access to the access restricted content.

5. The apparatus of claim 1, wherein the first, second and third digital rights management keys are each encrypted with 256 bit AES encryption.

6. The apparatus of claim 1, wherein at least one of the content database and the content providing server comprise a content registration module, wherein said content registration module registers the usage of the content on the content database with respect to the user identifier and the content identifier.

7. The apparatus of claim 1, wherein said status content usage includes the calculated time period associated with the user identifier and the content identifier.

8. The apparatus of claim 1, wherein the apparatus retrieves the first digital rights management key from at least one of the content database and the content providing server when required.

9. The apparatus of claim 1, wherein the apparatus generates the first digital rights management key when required, the generation being based on environment and media parameters.

10. A method, comprising:
obtaining an access restricted content from at least one of a content database and a content providing server;
obtaining a first digital rights management key from a content database, wherein the obtaining is based at least in part on a query, the query comprising the content identifier and an identifier associated with the user;
deriving, using the first digital rights management key, from the access restricted content a fingerprint of the access restricted content wherein the obtaining is based at least in part on the first digital rights management key,
causing the content providing server to validate the fingerprint, and, if the validation is successful, accessing the access restricted content and
information describing encryption properties of the access restricted content, and
deriving, using the digital rights management header of the access restricted content, from the access restricted content a second and third digital rights management key,
wherein the second and third digital rights management keys are applied to retrieve the payload of the access restricted content and wherein at least one of the second or third digital rights management key is used to encrypt the other key of the second or third digital rights management key,
wherein the content is usable without being in an unprotected state.

11. The method of claim 10, wherein the first digital rights management key is unique to a specific session.

* * * * *